(12) United States Patent
Park

(10) Patent No.: US 10,539,995 B2
(45) Date of Patent: Jan. 21, 2020

(54) PERFORMANCE BOOSTING METHOD AND SYSTEM OF SEMICONDUCTOR DEVICE

(71) Applicant: Samsung Electronics Co., Ltd., Suwon-si, Gyeonggi-do (KR)

(72) Inventor: Jong Lae Park, Anyang-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 168 days.

(21) Appl. No.: 15/652,588

(22) Filed: Jul. 18, 2017

(65) Prior Publication Data

US 2018/0181188 A1 Jun. 28, 2018

(30) Foreign Application Priority Data

Dec. 28, 2016 (KR) .................. 10-2016-0180998

(51) Int. Cl.
| | | |
|---|---|---|
| *G06F 11/30* | (2006.01) | |
| *G06F 1/3234* | (2019.01) | |
| *H04L 29/08* | (2006.01) | |
| *G06F 11/34* | (2006.01) | |

(52) U.S. Cl.
CPC .......... *G06F 1/3234* (2013.01); *G06F 11/302* (2013.01); *G06F 11/3419* (2013.01); *G06F 11/3438* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 2,444,218 | A | 6/1948 | Carnahan |
| 3,899,713 | A | 8/1975 | Barkan et al. |
| 5,027,391 | A | 6/1991 | O'Neill et al. |
| 8,487,653 | B2 | 7/2013 | Tarng et al. |
| 8,510,582 | B2 | 8/2013 | Naffziger et al. |
| 8,527,796 | B2 | 9/2013 | Werner |
| 8,862,918 | B2 | 10/2014 | Ganesan et al. |
| 2012/0127119 | A1* | 5/2012 | Li .................. G06F 3/038 345/174 |
| 2013/0242886 | A1 | 9/2013 | Chen et al. |
| 2015/0138157 | A1 | 5/2015 | Harris et al. |
| 2016/0070461 | A1* | 3/2016 | Herbordt ............. G06F 3/04883 345/178 |
| 2016/0202839 | A1 | 7/2016 | Hwang |
| 2016/0224180 | A1 | 8/2016 | Kim |
| 2016/0239069 | A1 | 8/2016 | Um et al. |
| 2017/0060222 | A1* | 3/2017 | Lee ................. G06F 1/3206 |

FOREIGN PATENT DOCUMENTS

| | | |
|---|---|---|
| KR | 2016-0087690 A | 7/2016 |
| KR | 2016-0095540 A | 8/2016 |
| KR | 2016-0100138 | 8/2016 |

* cited by examiner

*Primary Examiner* — Paul Yen
(74) *Attorney, Agent, or Firm* — Harness, Dickey & Pierce, P.L.C

(57) ABSTRACT

A performance boosting method of a semiconductor device includes monitoring input of a user and an amount of system usage, generating user system information in response to an event occurring, the user system information including first information and the amount of system usage, the first information regarding input of the user, adaptively determining a performance boosting target value based on the user system information, and boosting an operating frequency according to the performance boosting target value.

13 Claims, 11 Drawing Sheets

PERFORMANCE BOOSTING METHOD AND SYSTEM OF SEMICONDUCTOR DEVICE

This application claims priority to Korean Patent Application No. 10-2016-0180998, filed on Dec. 28, 2016, and all the benefits accruing therefrom under 35 U.S.C. § 119, the disclosure of which is incorporated herein by reference in its entirety.

BACKGROUND

1. Field

The present disclosure relates to a performance boosting method and system of a semiconductor device.

2. Description of the Related Art

Mobile devices, including smart phones, are generally powered by batteries. In order to increase the operating efficiency of mobile devices in an environment where only limited resources such as batteries are available, it is desired to appropriately manage the performance of mobile devices according to the circumstances.

Most mobile devices use a touch screen as their input means. More specifically, the touch screen of a mobile device receives a gesture operation from a user and provides the mobile device with location information indicating the location of the occurrence of the gesture operation and attribute information of the gesture operation.

In order to manage the performance of the mobile device, information input via the touch screen may be used. For example, the performance of the mobile device may be boosted when there is input from a user, rather than when there is no input to the touch screen.

SUMMARY

Since performance boosting may waste battery power when used in an unnecessary situation, a method is needed to perform performance boosting sophisticatedly.

At least some example embodiments of the present disclosure provide a performance boosting method of a semiconductor device, which is capable of adaptively adjusting performance boosting according to the pattern of a user's input and the amount of system usage.

At least some example embodiments of the present disclosure also provide a performance boosting system of a semiconductor device, which is capable of adaptively adjusting performance boosting according to the pattern of a user's input and the amount of system usage.

However, example embodiments of the present disclosure are not restricted to those set forth herein. The above and other example embodiments of the present disclosure will become more apparent to one of ordinary skill in the art to which the present disclosure pertains by referencing the detailed description of the present disclosure given below.

According to an example embodiment of the present disclosure, there is provided a performance boosting method of a semiconductor device including monitoring input of a user and an amount of system usage, generating user system information in response to an event occurring, the user system information including first information and the amount of system usage, the first information regarding the input of the user, adaptively determining a performance boosting target value based on the user system information and boosting an operating frequency according to the performance boosting target value.

According to another example embodiment of the present disclosure, there is provided a performance boosting system of a semiconductor device including a memory storing computer-readable instructions, and at least one processor configured to execute the computer-readable instructions to, monitor input of a user and an amount of system usage, generate user system information in response to an event occurring, the user system information including first information and the amount of system usage, the first information regarding the input of the user, adaptively determine a performance boosting target value based on the user system information, and boost an operating frequency according to the performance boosting target value.

According to at least another example embodiment, a performance boosting method of a system includes monitoring an input of a user, generating system information based on the input of the user, obtaining a boosting command based on the system information and setting an operating frequency of the system to a first frequency using the boosting command.

Other features and example embodiments may be apparent from the following detailed description, the drawings, and the claims.

BRIEF DESCRIPTION OF THE DRAWINGS

The above and other example embodiments and features of the present disclosure will become more apparent by describing in detail example embodiments thereof with reference to the attached drawings, in which.

DETAILED DESCRIPTION

Figure 1:
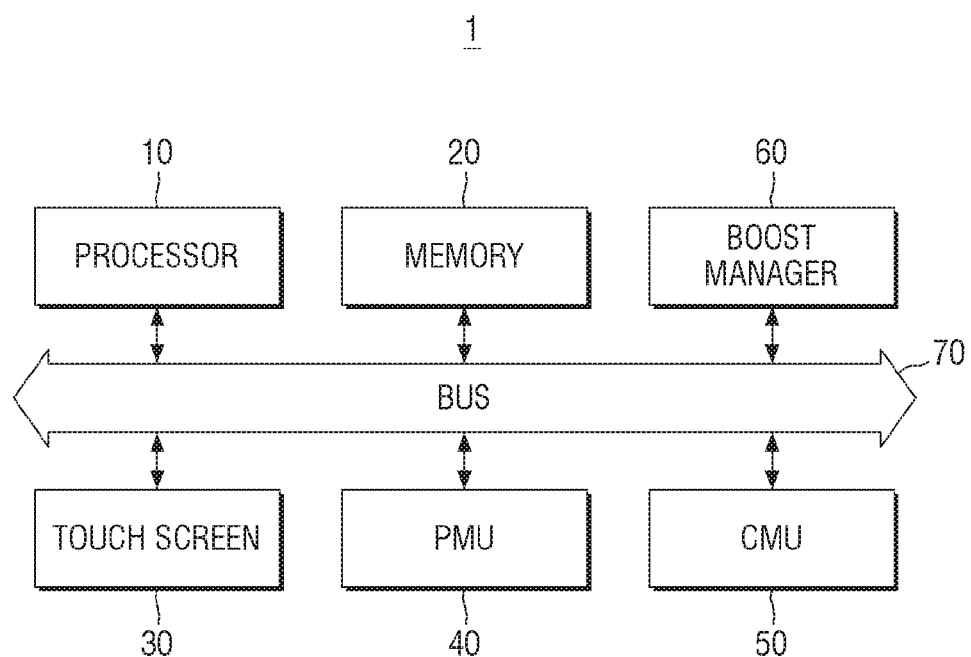
FIG. 1 is a block diagram of a performance boosting system of a semiconductor device according to an example embodiment of the present disclosure.

FIG. 1 is a block diagram of a performance boosting system of a semiconductor device according to an example embodiment of the present disclosure.

Referring to FIG. 1, a semiconductor device 1 may include a processor 10, a memory 20, a touch screen 30, a power management unit (PMU) 40, and a clock management unit (CMU) 50. The processor 10, the memory 20, the touch screen 30, the PMU 40, and the CMU 50 may be electrically connected by a bus 70 and may exchange data with one another.

A performance boosting technique of the semiconductor device 1 may be implemented as hardware, software, or both. In a case in which the performance boosting technique of the semiconductor device 1 is implemented as hardware, the semiconductor device 1 may further include a boost manager 60, which is implemented as an electric circuit. Alternatively, in a case in which the performance boosting technique of the semiconductor device 1 is implemented as software, the processor 10 of the semiconductor device 1 may execute performance boosting software loaded in the memory 20. A performance boosting element implemented as hardware and/or software will hereinafter be referred to as a performance boosting system.

The semiconductor device 1 may be, for example, a mobile device or a portable device such as a smart phone, a tablet computer, or a notebook computer, but the present disclosure is not limited thereto. That is, the semiconductor device 1 may also encompass various computing devices such as a desktop computer, a server computer, and the like.

The processor 10 controls the other elements of the semiconductor device 1 and processes various computations for an operation of the semiconductor device. The processor 10 may include, for example, at least one of a Central Processing Unit (CPU), a Graphic Processing Unit (CPU), an Application Processor (AP). Application Specific Integrated Circuit (ASIC) and a Communication Processor (CP), but the present disclosure is not limited thereto.

The memory 20 stores performance boosting software and allows the processor 10 to execute the performance boosting software. The memory 20 may include a volatile memory such as a dynamic random access memory (DRAM) or a nonvolatile memory such as a flash memory.

The touch screen 30 receives a gesture operation from a user and provides the semiconductor device 1 with location information indicating the location of the occurrence of the gesture operation and attribute information of the gesture operation. The touch screen 30 may be implemented as a resistance film-type, capacitive-type, infrared-type, or ultrasonic-type touch screen, but the present disclosure is not limited thereto.

The PMU 40 manages the power of the semiconductor device 1. More specifically, the PMU 40 may control the boosting operation of the semiconductor device 1, or may operate the semiconductor device 1 in a low power mode or a sleep mode to lower the power consumption of the semiconductor device 1.

The CMU 50 manages a clock signal provided for the elements mounted in the semiconductor device 1. For example, the CMU 50 may generate a clock signal for operating elements such as the processor 10, may change the frequency of the clock signal depending on the circumstances of the semiconductor device 1, or may perform clock gating.

For convenience, only the memory 20, the touch screen 30, the PMU 40, the CMU 50, and the boost manager 60 are illustrated as the elements of the semiconductor device 1, but the present disclosure is not limited thereto. It is obvious to those skilled in the art that the semiconductor device 1 may further include arbitrary computing elements.

Figure 2:
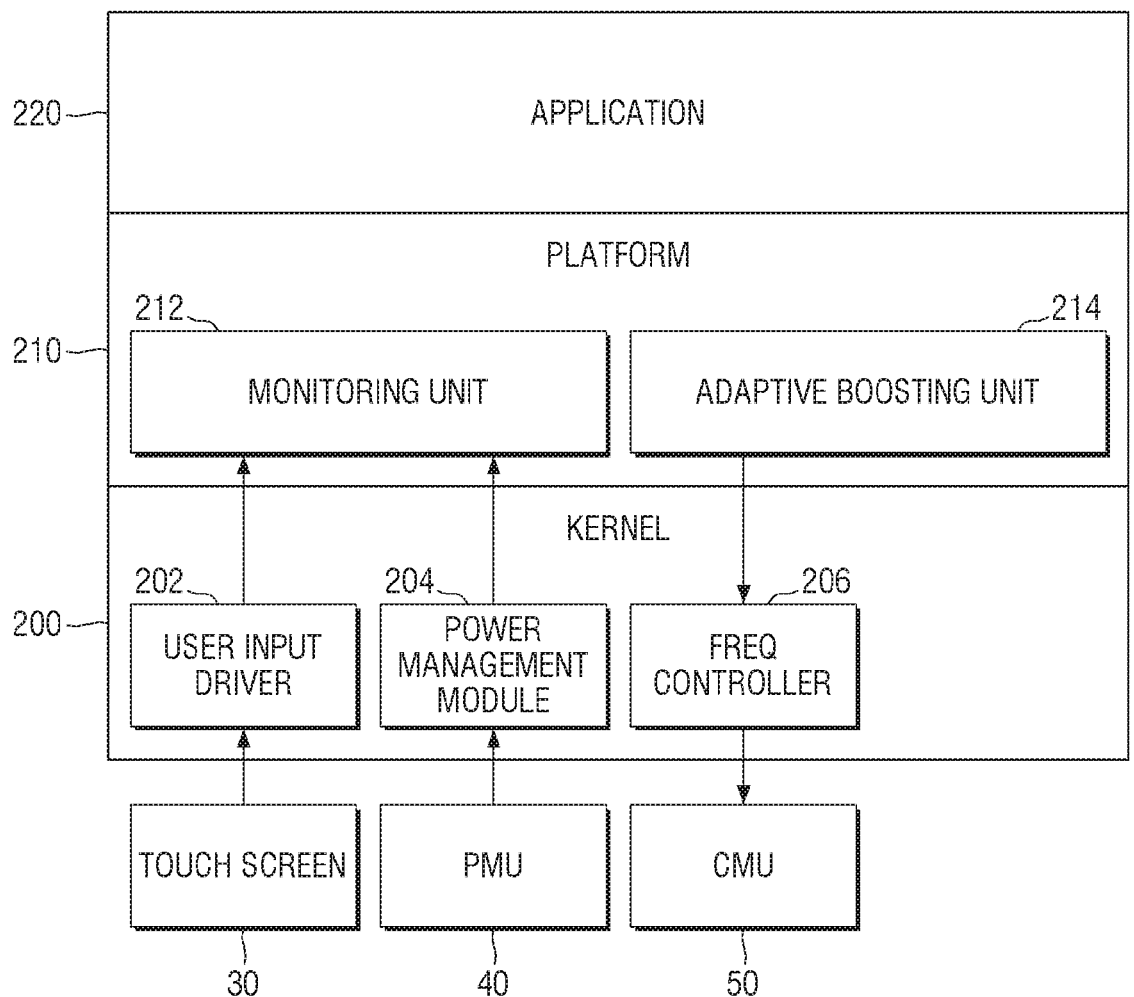
FIG. 2 is a block diagram of a performance boosting system of a semiconductor device according to an example embodiment of the present disclosure.

FIG. 2 is a block diagram of a performance boosting system of a semiconductor device according to an example embodiment of the present disclosure.

Referring to FIG. 2, the performance boosting system may be implemented as software in the memory 20.

The memory 20 may be logically divided into areas where a kernel 200, a platform 210, and an application 220 are mounted.

The kernel 200 controls and manages system resources used to execute the platform 210 or the application 220. For example, the kernel 200 may control and manage system resources such as the touch screen 30, the PMU 40, and the CMU 50 via a user input driver 202, a power management module 204, and a frequency controller 206 that will be described later. In some example embodiments, the kernel 200 may be, for example, a Linux kernel, but the present disclosure is not limited thereto.

The platform 210 provides an operating environment in which the application 220 can be executed based on the kernel 200. For example, the platform 210 may provide various functions that the application 220 can use, by utilizing the user input driver 202, the power management module 204, and the frequency controller 206. In some example embodiments, the platform 210 may be, for example, an Apache platform, but the present disclosure is not limited thereto.

The application 220 may receive a request from the user, may process the request on the platform 210 using the system resources via the kernel 200, and may then provide the result of the processing to the user.

The performance boosting software is illustrated as being implemented in the platform 210, but the present disclosure is not limited thereto. That is, alternatively, the performance boosting software may be implemented at the level of the application 220 or the kernel 200.

The performance boosting software, which is implemented in the platform 210, includes a monitoring unit 212 and an adaptive boosting unit 214.

The monitoring unit 212 monitors the user's input and the amount of system usage, and the adaptive boosting unit 214 performs adaptive performance boosting according to the user's input and the amount of system usage, determined by the monitoring unit 212.

More specifically, the monitoring unit 212 monitors the user's input received via, for example, the touch screen 30, and the amount of system usage provided by the PMU 40, and generates user system information 80 (shown in FIG. 3) based on the result of the monitoring upon the occurrence of a particular event.

Examples of the particular event include a touch press event, a touch release event, and an application launch event.

The adaptive boosting unit 214 adaptively determines a performance boosting target value based on the user system information 80 and may boost the operating frequency of the processor 10 by controlling the CMU 50 via, for example, a frequency controller 206, according to the determined performance boosting target value so as to adjust the frequency of a clock signal.

The monitoring unit 212 and the adaptive boosting unit 214 will hereinafter be described with reference to FIGS. 3 and 4.

Figure 3:
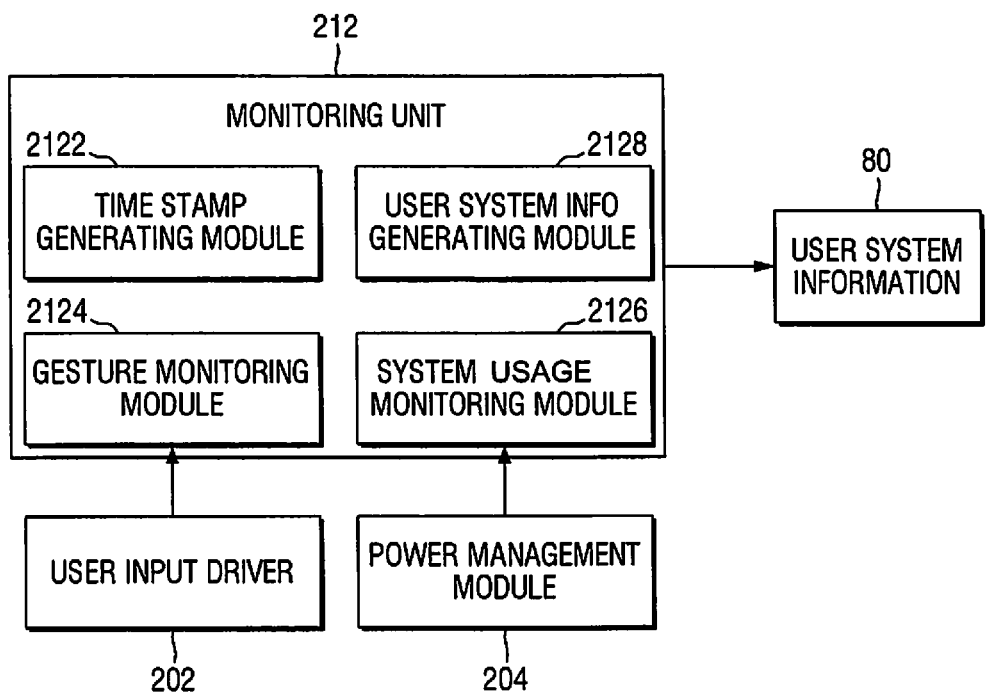
FIG. 3 is a block diagram of a monitoring unit of the performance boosting system according to the example embodiment of FIG. 2.

FIG. 3 is a block diagram of the monitoring unit of the performance boosting system according to the example embodiment of FIG. 2.

Referring to FIG. 3, the monitoring unit 212 includes a time stamp generating module 2122, a gesture monitoring module 2124, a system usage monitoring module 2126, and a user system information generating module 2128.

The time stamp generating module 2122 generates time stamp information indicating the time of occurrence of an event. The time stamp information is included in the user system information 80 and may be used for the adaptive boosting unit 214 to calculate the speed or acceleration of the user's input.

The gesture monitoring module 2124 monitors gesture input received via the touch screen 30. The gesture monitoring module 2124 may acquire, from the gesture input, coordinate information of the location of the occurrence of a gesture and press/release information indicating the attributes of the gesture.

The system usage monitoring module 2126 monitors the amount of system usage provided via the PMU 40. For example, the system usage monitoring module 2126 may receive the amount of system usage in the form of a percentage (%) in real time via the PMU 40. In some example embodiments, the amount of system usage may include a CPU ratio.

The user system information generating module 2128 generates the user system information 80 including the coordinate information and the press/release information of the gesture, acquired by the gesture monitoring module 2124, and the amount of system usage provided to the system usage monitoring module 2126 via the PMU 40. The user system information 80 may further include the time stamp information generated by the time stamp generating module 2122.

The monitoring unit 212 sends the user system information 80 to the adaptive boosting unit 214.

Figure 4:
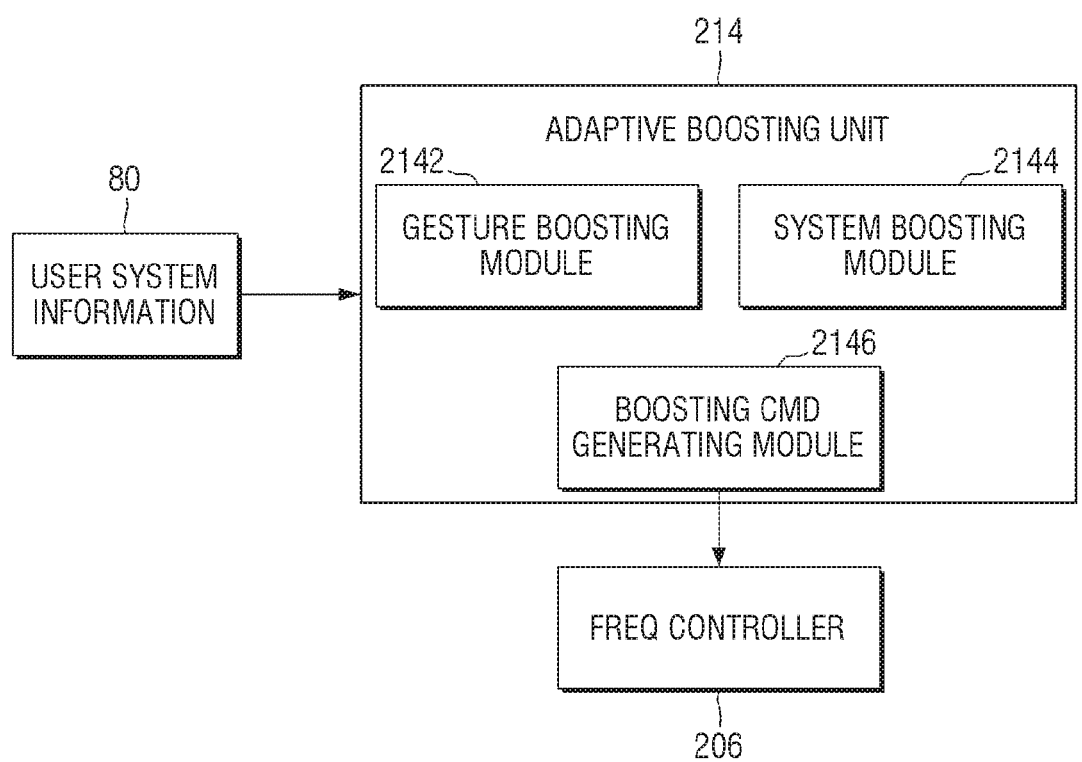
FIG. 4 is a block diagram of an adaptive boosting unit of the performance boosting system according to the example embodiment of FIG. 2.

FIG. 4 is a block diagram of the adaptive boosting unit of the performance boosting system according to the example embodiment of FIG. 2.

Referring to FIG. 4, the adaptive boosting unit 214 includes a gesture boosting module 2142, a system boosting module 2144, and a boosting command generating module 2146. The adaptive boosting unit 214 receives the user system information 80 from the monitoring unit 212.

The gesture boosting module 2142 calculates the speed or acceleration of the user's input or recognizes a press/release pattern using gesture information included in the user system information 80 such as, for example, the coordinate information and the press/release information of the gesture.

The system boosting module 2144 calculates the amount or pattern of variation in the amount of system usage using the system usage amount information included in the user system information 80.

The boosting command generating module 2146 controls the frequency of a clock signal by controlling, for example, the CMU 50, with the use of information calculated by the gesture boosting module 2142 and the system boosting module 2144, and thereby provides a boosting command to the frequency controller 206 to boost the operating frequency of the processor 10.

In some example embodiments, the boosting command generating module 2146 may determine the performance boosting target value based on the speed (moving speed) of the user's input, calculated from the coordinate information of the gesture by the gesture boosting module 2142, and the amount of system usage provided by the system boosting module 2144. In some example embodiments, the performance boosting target value may be the operating frequency of the processor 10.

For example, if the speed of the user's input increases, the boosting command generating module 2146 may increase the operating frequency of the processor 10 because the increase of the speed of the user's input may mean the increase of the amount of workload that needs to be processed per unit time. For the same reason, the boosting command generating module 2146 may lower the operating frequency of the processor 10 if the speed of the user's input decreases. The boosting command generation module 2146 may not increase the operating frequency of the processor 10 if the speed of the user's input is high but the amount of system usage is considerably small.

In other example embodiments, the boosting command generating nodule 2146 may determine the length of a period for which to boost the operating frequency of the processor 10 based on the acceleration of the user's input, calculated from the coordinate information of the gesture by the gesture boosting module 2142, and a variation in the amount of system usage provided by the system boosting module 2144.

For example, if the acceleration of the user's input increases, the boosting command generating module 2146 may increase the length of the period for which to boost the operating frequency of the processor 10 because the increase of the acceleration of the user's input may mean the increase of the amount of workload that needs to be processed per unit time after the occurrence of a touch release event. For the same reason, the boosting command generating module 2146 may lower the operating frequency of the processor 10 if the acceleration of the user's input decreases. On the other hand, when the amount of system usage is large, the boosting command generation module 2146 may determine that the circumstances of the performance boosting system are not uniform but variable, and may increase the operating frequency of the processor 10.

The performance boosting system including the monitoring unit 212 and the adaptive boosting unit 214 can perform adaptive performance boosting according to the pattern of the user's input and the amount of system usage. Accordingly, improved and/or optimal performance boosting can be provided to the semiconductor device 1, and at the same time, a waste of power can be mitigated and/or prevented.

Figure 5:
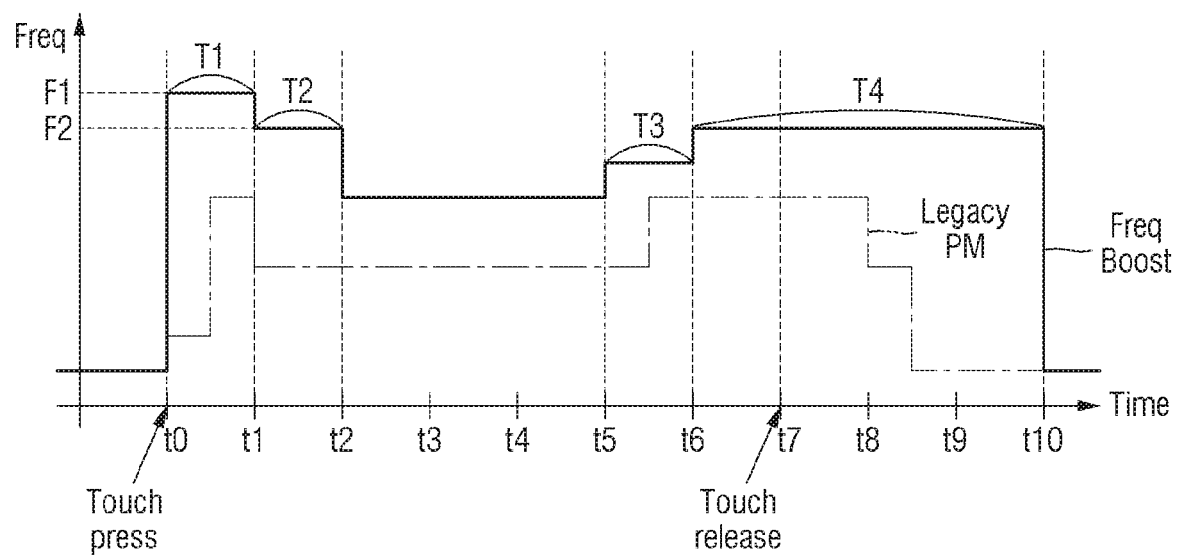
FIG. 5 is a timing diagram illustrating an example operation of the performance boosting system according to the example embodiment of FIG. 2.

FIG. 5 is a timing diagram illustrating an example operation of the performance boosting system according to the example embodiment of FIG. 2.

Referring to FIG. 5, a solid line represents a boosted operating frequency that can be provided by a performance boosting method and system of a semiconductor device according to some example embodiments of the present invention, and a dot-and-dash line represents a boosted operating frequency that can be provided by a conventional power management scheme (for example, a Dynamic Voltage and Frequency Switching (DVFS) method).

In a case in which a touch press event occurs for the first time at a time t0, the frequency of a clock signal provided to, for example, the processor 10, is increased to an operating frequency F1 in a period T1 because the amount of workload that needs to be processed per unit time is expected to increase.

A predetermined and/or desired amount of time after the occurrence of the touch press event at the time t1, the amount of workload that needs to be processed per unit time slightly decreases. Thus, the frequency of the clock signal decreases from the operating frequency F1 to an operating frequency F2 and is then maintained at the operating frequency F2 for a period T2.

Thereafter, at a time t6 when a touch release event is expected to occur or at a time t7 when the touch release event actually occurs, the frequency of the dock signal may be increased again to the operating frequency F2 because the amount of workload that needs to be processed per unit time is expected to rapidly increase again.

In this manner, performance boosting can be adaptively controlled according to the pattern of the user's input and the amount of system usage. Accordingly, improved and/or optimal performance boosting can be provided to the semiconductor device 1, and at the same time, a waste of power can be mitigated and/or prevented.

Figure 6:
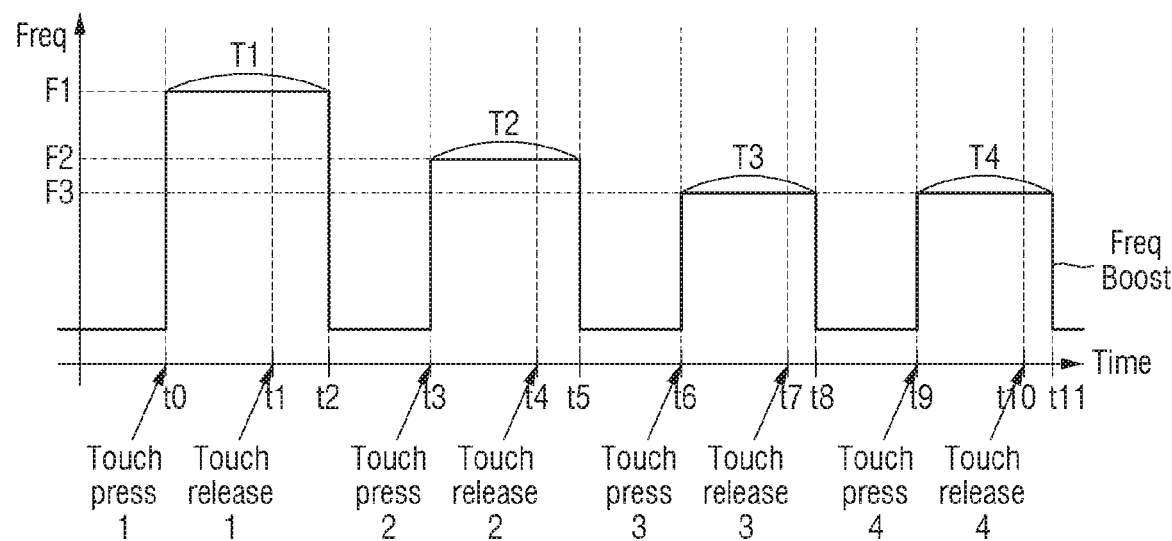
FIG. 6 is a timing diagram illustrating another example operation of the performance boosting system according to the example embodiment of FIG. 2.

FIG. 6 is a timing diagram illustrating another example operation of the performance boosting system according to the example embodiment of FIG. 2.

More specifically, FIG. 6 illustrates an operation of the performance boosting system according to the example embodiment of FIG. 2 in a case in which a touch press event and a touch release event repeatedly occur as in the case of, for example, writing a document using a keyboard.

The boosting command generating module 2146 may determine an operating frequency in consideration of a press/release pattern obtained from the press/release information by the gesture boosting module 2142.

A touch press event and a touch release event occur for the first time at times t0 and t1, respectively, and occur for the second time at times t3 and t4, respectively.

Since the amount of workload that needs to be processed per unit time is expected to increase considerably at the times t0 and t1, the frequency of a clock signal is increased to an operating frequency F1 in a period T1.

At the times t3 and t4 when the touch press event and the touch release event occur for the second time, the frequency of the clock signal is increased to an operating frequency F2, which is lower than the operating frequency F1, in a period T2.

The touch press event and the touch release event occur for the third time at times t6 and t7, respectively, and for the fourth time at times t9 and t10, respectively.

Then, it may be recognized that the touch press event and the touch release event repeatedly occur. In this case, since a command or data of the application 220 (for example, a keyboard application) is already cached, the amount of workload that needs to be processed per unit time is expected to be less than at the times t0 and t1 or at the times t3 and t4. Thus, the degree of boosting may be alleviated so that the frequency of the clock signal may increase to an operating frequency F3, which is lower than the operating frequency F1 or F2. In this manner, performance boosting can be adaptively controlled according to the pattern of the user's input and the amount of system usage. Accordingly, improved and/or optimal performance boosting can be provided to the semiconductor device and at the same time, a waste of power can be mitigated and/or prevented.

Figure 7:
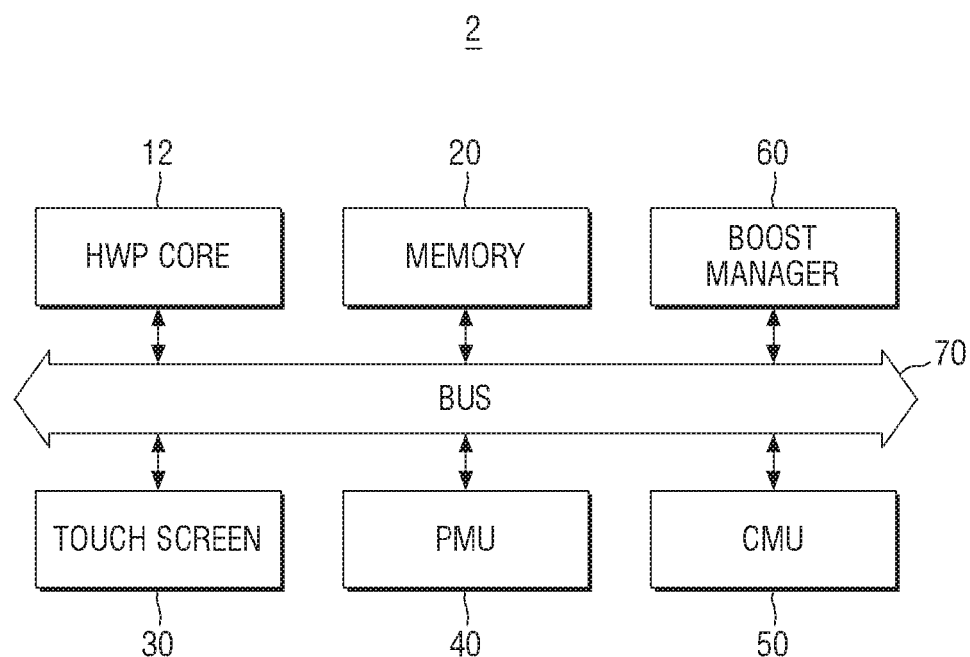
FIG. 7 is a block diagram of a performance boosting system of a semiconductor device according to an example embodiment of the present disclosure.

FIG. 7 is a block diagram of a performance boosting system of a semiconductor device according to an example embodiment of the present disclosure.

Referring to FIG. 7, a semiconductor device 2, unlike the semiconductor device 1 of FIG. 1, includes a Heterogeneous Multi-Processing (HMP) core 12, instead of the processor 10. Accordingly, the semiconductor device 2 may include the HMP core 12, a memory 20, a touch screen 30, a PMU 40, and a CMU 50, and the HMP core 12, the memory 20, the touch screen 30, the PMU 40, and the CMU 50 may be electrically connected by a bus 70 and may exchange data with one another.

As described above with reference to FIG. 1 in a case in which a performance boosting technique of the semiconductor device 2 is implemented as hardware, the semiconductor device 2 may further include a boost manager 60, which is implemented as an electric circuit. Alternatively, in a case in which the performance boosting technique of the semiconductor device 2 is implemented as software, the HMP core 12 of the semiconductor device 2 may execute performance boosting software loaded in the memory 20.

For convenience, only the HMP core 12, the memory 20, the touch screen 30, the PMU 40, the CMU 50, and the boost manager 60 are illustrated as the elements of the semiconductor device 2, but the present disclosure is not limited thereto. It is obvious to those skilled in the art that the semiconductor device 2 may further include arbitrary computing elements.

Figure 8:
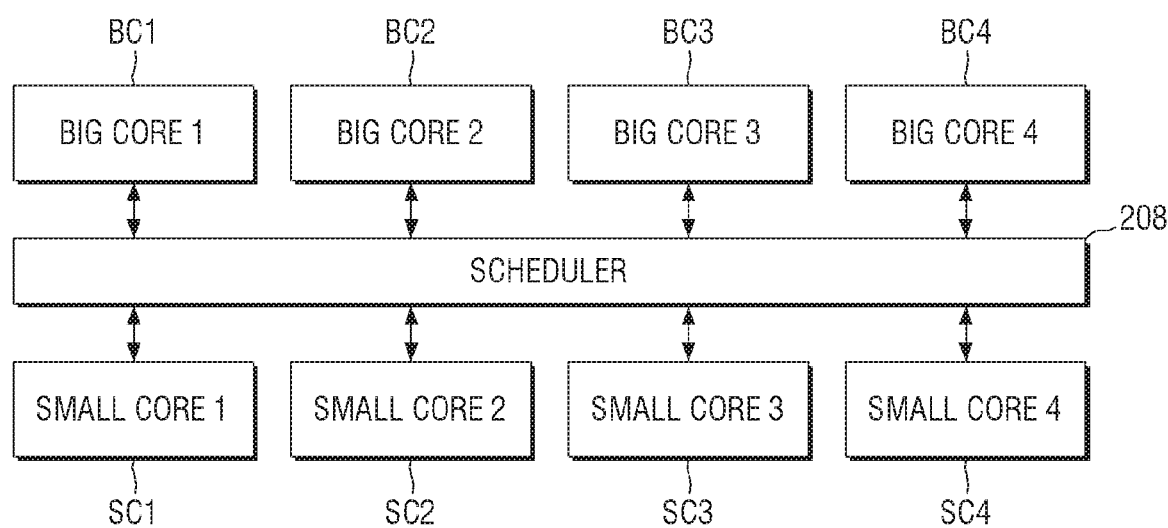
FIG. 8 is a block diagram of a Heterogeneous Multi-Processing (HMP) core of the semiconductor device according to the example embodiment of FIG. 7.

FIG. 8 is a block diagram of the HMP core of the semiconductor device according to the example embodiment of FIG. 7.

Referring to FIG. 8, the HMP core 12 may include a plurality of big cores BC1 through BC4 and a plurality of small cores SC1 through SC4. In some example embodiments, the HMP core 12 may be a big.LITTLE™ architecture developed by ARM Holdings, but the present disclosure is not limited thereto.

The big cores BC1 to BC4 are high-performance cores with relatively high power consumption, and the small cores SC1 to SC4 are low-performance cores with relatively low power consumption. In general, since only one of these two types of cores is activated at once but all the cores use the same memory area, workloads can be allocated between the big cores BC1 to BC4 and the small cores SC1 to SC4 in order to allocate cores dynamically according to the amount of computation in a multi-core environment and thus to achieve a higher level of power consumption than clock control alone.

A scheduler 208 may perform global task scheduling to support HMP. The scheduler 208 may generally be implemented at the level of the kernel 200, but the present disclosure is not limited thereto.

Figure 9:
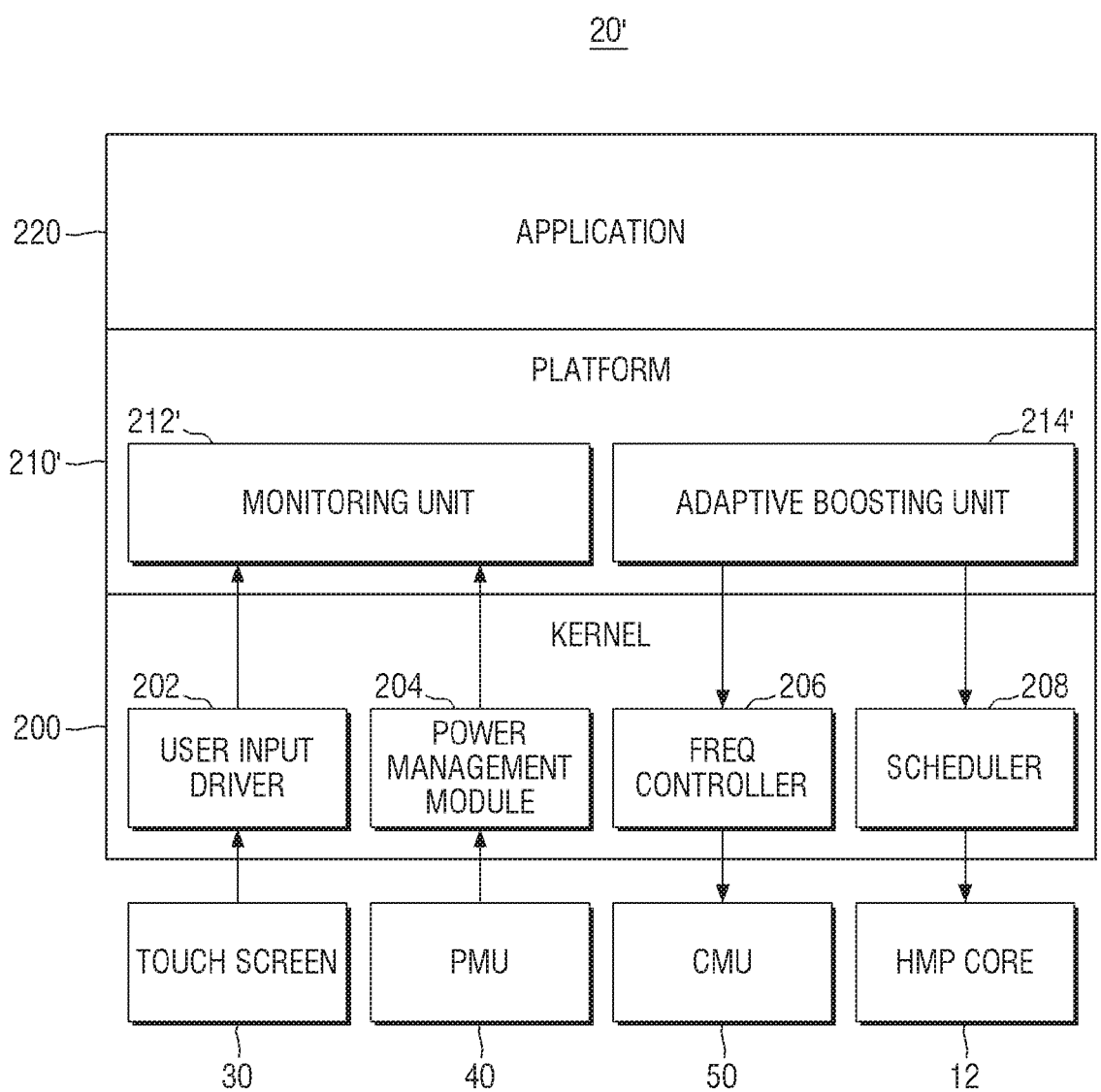
FIG. 9 is a block diagram of a performance boosting system of a semiconductor device according to another example embodiment of the present disclosure.

FIG. 9 is a block diagram of a performance boosting system of a semiconductor device according to another example embodiment of the present disclosure.

Referring to FIG. 9, a memory 20' includes a platform 210' having a monitoring unit 212' that monitors a user's input and the amount of system usage, and an adaptive boosting unit 214' that performs adaptive performance boosting according to the user's input and the amount of system usage, determined by the monitoring unit 212'.

More specifically, the monitoring unit 212' monitors the user's input received via, for example, the touch screen 30, and the amount of system usage provided by the PMU 40, and generates user system information 80 based on the result of the monitoring upon the occurrence of a particular event.

Examples of the particular event include a touch press event, a touch release event, and an application launch event.

The adaptive boosting unit 214' adaptively determines a performance boosting target value based on the user system information 80 and may boost the operating frequency of the processor 10 by controlling the CMU 50 via, for example, a frequency controller 206, according to the determined performance boosting target value so as to adjust the frequency of a clock signal.

However, the adaptive boosting unit 214', unlike its counterpart of FIG. 2, may additionally set an HMP boost by controlling the scheduler 208 according to the determined performance boosting target value. That is, the adaptive boosting unit 214' may activate the big cores BC1 through BC4 of the HMP core 12 during a period when the amount of workload that needs to be processed per unit time is expected to increase.

Figure 10:
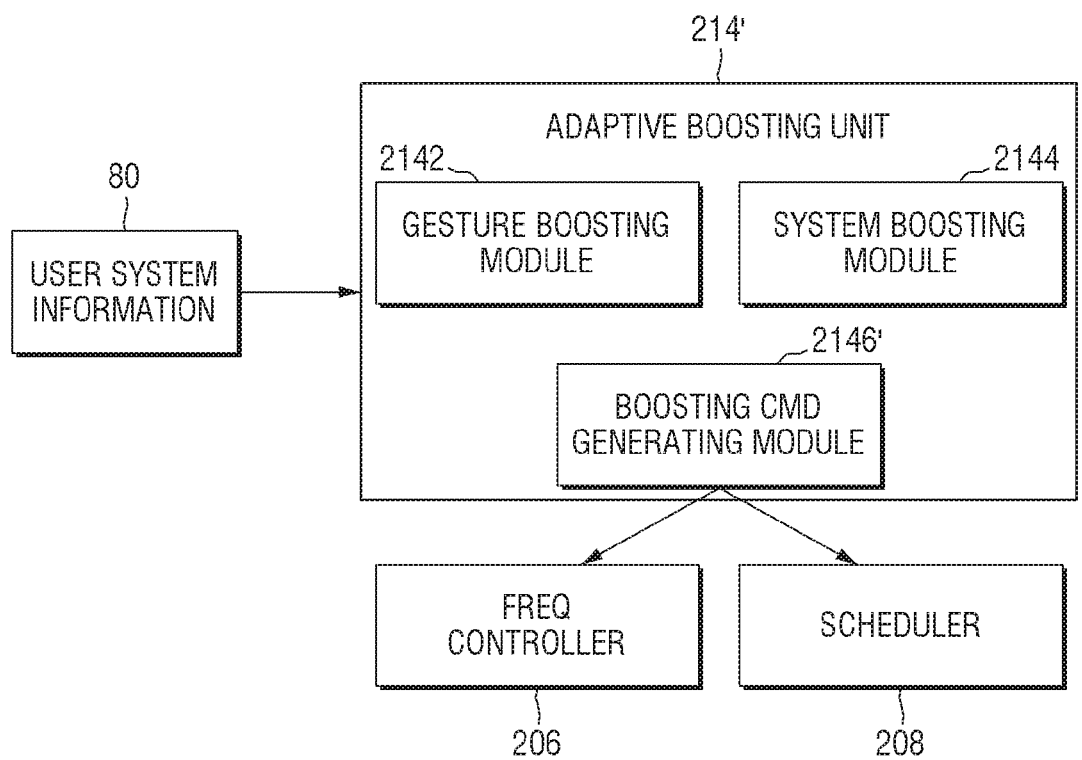
FIG. 10 is a block diagram of an adaptive boosting unit of the performance boosting system according to the example embodiment of FIG. 9.

FIG. 10 is a block diagram of the adaptive boosting unit of the performance boosting system according to the example embodiment of FIG. 9.

Referring to FIG. 10, the adaptive boosting unit 214 includes a gesture boosting module 2142, a system boosting module 2144, and a boosting command generating module 2146'. The adaptive boosting unit 214' receives the user system information 80 from the monitoring unit 212.

The boosting command generating module 2146' controls the frequency of a clock signal by controlling, for example, the CMU 50, with the use of information calculated by the gesture boosting module 2142 and the system boosting module 2144, and thereby provides a boosting command to the frequency controller 206 to boost the operating frequency of the processor 10. The boosting command generating module 2146' may also provide a boosting command to the scheduler 208 to additionally set an HMP boost.

In some example embodiments, the boosting command generating module 2146 may determine the operating frequency of the processor 10 based on the speed (moving speed) of the user's input, calculated from the coordinate information of the gesture by the gesture boosting module 2142, and the amount of system usage provided by the system boosting module 2144.

In other example embodiments, the boosting command generating module 2146' may determine the length of a period for which to boost the operating frequency of the processor 10 based on the acceleration of the user's input, calculated from the coordinate information of the gesture by the gesture boosting module 2142, and a variation in the amount of system usage provided by the system boosting module 2144.

In other example embodiments, the boosting command generating module 2146 may set an HMP boost based on the acceleration of the user's input, calculated from the coordinate information of the gesture by the gesture boosting module 2142, and the variation in the amount of system usage provided by the system boosting module 2144.

For example, if the acceleration of the user's input increases, the boosting command generating module 2146' may activate the big cores BC1 through BC4 of the HMP core 12 because the increase of the acceleration of the user's input may mean the increase of the amount of workload that needs to be processed per unit time after the occurrence of a touch release event. For the same reason, the boosting command generating module 2146' may activate the small cores SC1 through SC4 of the HMP core 12 if the acceleration of the user's input decreases. On the other hand, when the amount of system usage is large, the boosting command aeneration module 2146' may determine that the circumstances of the performance boosting system are not uniform but variable, and may activate the big cores BC1 through BC4 of the HMP core 12.

The performance boosting system including the monitoring unit 212 and the adaptive boosting unit 214 can perform adaptive performance boosting according to the pattern of the user's input and the amount of system usage. Accordingly, improved and/or optimal performance boosting can be provided to the semiconductor device 2, and at the same time, a waste of power can be mitigated and/or prevented.

Figure 11:
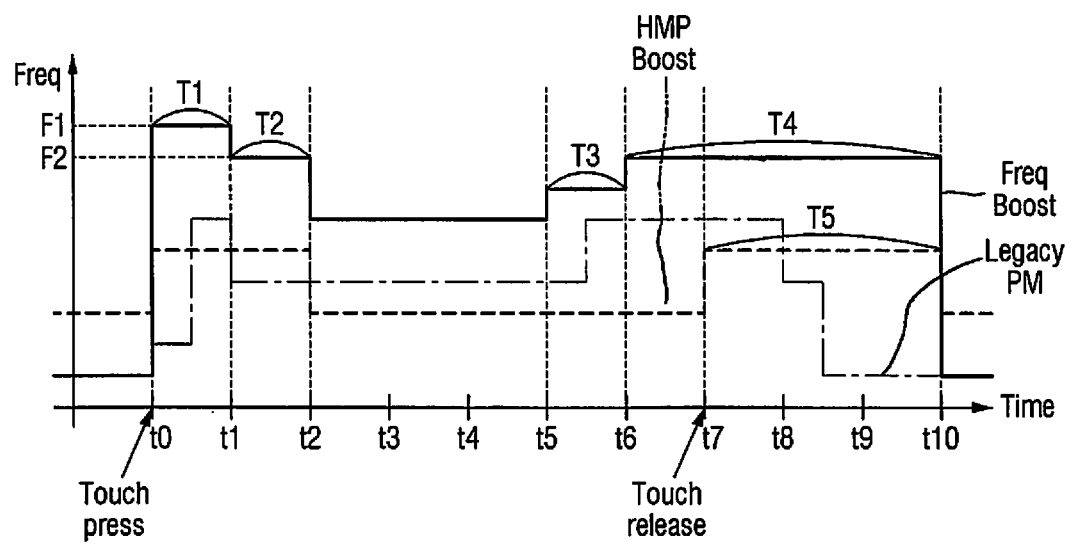
FIG. 11 is a timing diagram illustrating an example operation of the performance boosting system according to the example embodiment of FIG. 9.

FIG. 11 is a timing diagram illustrating an example operation of the performance boosting system according to the example embodiment of FIG. 9.

Referring to FIG. 11, a solid line represents a boosted operating frequency provided by a performance boosting method and system of a semiconductor device according to example embodiments of the present invention, a dotted line represents whether an HMP boost is set, and a dot-and-dash line represents a boosted operating frequency provided by a conventional power management scheme (for example, a DVFS method).

In a case in which a touch press event occurs for the first time at a time t0, the frequency of a clock signal provided to, for example, the processor 10 is increased to an operating frequency F1 in a period T1 because the amount of workload that needs to be processed per unit time is expected to increase.

A predetermined and/or desired amount of time after the occurrence of the touch press event at the time t1, the amount of workload that needs to be processed per unit time slightly decreases. Thus, the frequency of the clock signal decreases from the operating frequency F2 to an operating frequency T2 and is then maintained at the operating frequency F2 for a period T2.

During the periods T1 and T2, the big cores BC1 through BC4 of the HMP core 12 are activated to operate.

Thereafter, at a time t6 when a touch release event is expected to occur or at a time t7 when the touch release event actually occurs, the frequency of the clock signal may be increased again to the operating frequency F2 because the amount of workload that needs to be processed per unit time is expected to rapidly increase again.

In a period T5 beginning from the time of the occurrence of the touch release event, i.e., the time t7, the big cores BC1 through BC4 of the HMP core 12 may be activated to operate.

In this manner, performance boosting can be adaptively controlled according to the pattern of the user's input and the amount of system usage. Accordingly, improved and/or optimal performance boosting can be provided to the semiconductor device 1, and at the same time, a waste of power can be mitigated and/or prevented.

Figure 12:
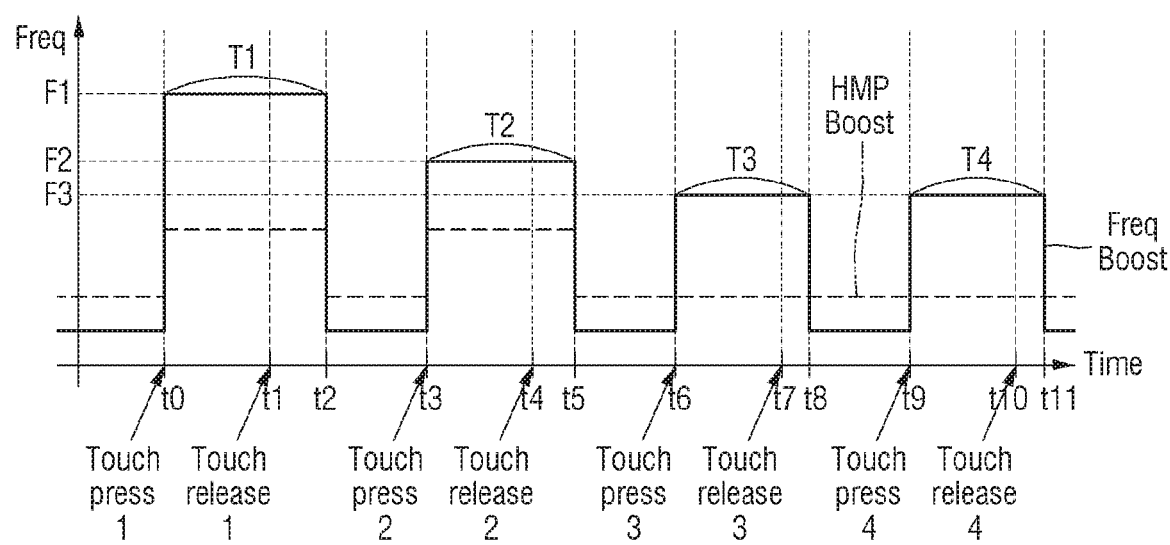
FIG. 12 is a timing diagram illustrating another example operation of the performance boosting system according to the example embodiment of FIG. 9.

FIG. 12 is a timing diagram illustrating another example operation of the performance boosting system according to the example embodiment of FIG. 9.

More specifically, FIG. 12 illustrates an operation of the performance boosting system according to the example embodiment of FIG. 2 in a case in which a touch press event and a touch release event repeatedly occur as in the case of, for example, writing a document using a keyboard.

The boosting command generating module 2146' may determine an operating frequency in consideration of a press/release pattern obtained from the press/release information by the gesture boosting module 2142.

A touch press event and a touch release event occur for the first time at times t0 and t1, respectively, and occur for the second time at times t3 and t4, respectively.

Since the amount of workload that needs to be processed per unit time is expected to considerably increase at the times t0 and t1 the frequency of the clock signal is increased to an operating frequency F1 in a period T1.

During the period T1, the big cores BC1 through BC4 of the HMP core 12 are activated to operate.

At the times t3 and t4 when the touch press event and the touch release event occur for the second time, the frequency of the clock signal is increased to an operating frequency F2, which is lower than the operating frequency F1, in a period T2.

During the period T2, the big cores BC1 through BC4 of the HMP core 12 are activated to operate.

The touch press event and the touch release event occur for the third time at times t6 and t7, respectively, and for the fourth time at times t9 and t10, respectively.

Then, it may be recognized that the touch press event and the touch release event repeatedly occur. In this case, since a command or data of the application 220 (for example, a keyboard application) is already cached, the amount of workload that needs to be processed per unit time is expected to be less than at the times t0 and t1 or at the times t3 and t4. Thus, the degree of boosting may be alleviated so that the frequency of the clock signal may increase to an operating frequency F3, which is lower than the operating frequency F1 or F2.

During periods T3 and T4, the big cores BC1 through BC4 of the HMP core 12 are not activated.

In this manner, performance boosting can be adaptively controlled according to the pattern of the user's input and the amount of system usage. Accordingly, improved and/or optimal performance boosting can be provided to the semiconductor device 1, and at the same time, a waste of power can be mitigated and/or prevented.

While the present disclosure has been particularly illustrated and described with reference to example embodiments thereof, it will be understood by those of ordinary skill in the art that various changes in form and detail may be made therein without departing from the spirit and scope of the present disclosure as defined by the following claims. The example embodiments should be considered in a descriptive sense only and not for purposes of limitation.

What is claimed is:

1. A performance boosting method of a semiconductor device, comprising:
    monitoring input of a user and an amount of system usage;
    generating user system information in response to an event occurring, the user system information including first information and the amount of system usage, the first information regarding input of the user, and the user system information including coordinate information and press/release information acquired from the first information;
    adaptively determining a performance boosting target value based on the user system information, the adaptively determining including,
        calculating an acceleration of the input of the user based on the coordinate information, and
        adaptively determining the performance boosting target value based on the calculated acceleration of the input of the user, the adaptively determining including,
            calculating a variation in the amount of system usage, and
            determining a length of a period for which to boost an operating frequency based on the calculated acceleration and the variation in the amount of system usage; and
    boosting the operating frequency according to the performance boosting target value.

2. The performance boosting method of claim 1, wherein the adaptively determining the performance boosting target value comprises:
    recognizing a press/release pattern from the press/release information; and
    determining the boosted operating frequency based on the press/release pattern.

3. The performance boosting method of claim 1, further comprising:
    setting a Heterogeneous Multi-Processing (HMP) boost according to the performance boosting target value.

4. The performance boosting method of claim 3, wherein the adaptively determining the performance boosting target value comprises:
    determining whether to set the HMP boost based on the calculated acceleration and the variation in the amount of system usage.

5. The performance boosting method of claim 3, wherein the adaptively determining the performance boosting target value comprises:
    recognizing a press/release pattern from the press/release information and determining whether to set the HMP boost based on the press/release pattern.

6. A performance boosting method of a system, the method comprising:
    monitoring an input of a user;
    calculating a variation of an amount of usage of the system;
    calculating an acceleration of the input of the user based on the coordinate information;
    generating a boosting command based on the calculated acceleration of the input of the user, the generating including,
        determining a length of time for which to boost an operating frequency of the system based on the calculated acceleration and the variation in the amount of usage of the system; and
    setting the operating frequency of the system to a first frequency using the boosting command.

7. The performance boosting method of claim 6, further comprising:
    maintaining the operating frequency of the system for the determined length of time after a first input part of the user ends;
    detecting a second input part of the user; and
    setting the operating frequency of the system to a second frequency based on the second input part of the user, the second frequency being lower than the first frequency.

8. The performance boosting method of claim 6, further comprising:
    determining a pattern of the input of the user, the generating generates the boosting command based on the pattern of the input of the user.

9. The performance boosting method of claim 6, wherein the input of the user includes at least one of a touch press event, a touch release event and an application launch event.

10. A performance boosting method of a semiconductor device, comprising:
    monitoring input of a user and an amount of system usage;
    generating user system information in response to an event occurring, the user system information including first information and the amount of system usage, the first information regarding input of the user;
    adaptively determining a performance boosting target value based on the user system information;
    setting a Heterogeneous Multi-Processing (HMP) boost according to the performance boosting target value; and
    boosting an operating frequency according to the performance boosting target value,
        wherein the adaptively determining the performance boosting target value comprises, calculating an acceleration of the input of the user;
calculating a variation in the amount of system usage; and
determining whether to set the HMP boost based on the calculated acceleration and the variation in the amount of system usage.

11. The performance boosting method of claim 10, wherein the user system information includes coordinate information and press/release information acquired from the first information.

12. The performance boosting method of claim 11, wherein the acceleration of the input of the user is calculated based on the coordinate information.

13. The performance boosting method of claim 12, wherein the adaptively determining the performance boosting target value comprises:
recognizing a press/release pattern from the press/release information and determining whether to set the HMP boost based on the press/release pattern.

* * * * *